US011610102B1

(12) United States Patent
Zejda et al.

(10) Patent No.: US 11,610,102 B1
(45) Date of Patent: Mar. 21, 2023

(54) TIME-BASED MEMORY ALLOCATION FOR NEURAL NETWORK INFERENCE

(71) Applicant: Amazon Technologies, Inc., Seattle, WA (US)

(72) Inventors: Jindrich Zejda, Saratoga, CA (US); Drazen Borkovic, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 668 days.

(21) Appl. No.: 16/698,425

(22) Filed: Nov. 27, 2019

(51) Int. Cl.
*G06N 3/063* (2006.01)
*G06N 3/04* (2006.01)

(52) U.S. Cl.
CPC ............... *G06N 3/063* (2013.01); *G06N 3/04* (2013.01)

(58) Field of Classification Search
CPC .................................. G06N 3/063; G06N 3/04
See application file for complete search history.

(56) References Cited

U.S. PATENT DOCUMENTS

| 10,426,442 | B1* | 10/2019 | Schnorr | A61B 8/5223 |
|---|---|---|---|---|
| 2016/0163035 | A1* | 6/2016 | Chang | G06K 9/6274 |
| | | | | 382/149 |
| 2018/0129620 | A1* | 5/2018 | Gittins | G06F 12/1027 |
| 2018/0248562 | A1* | 8/2018 | Redfern | G06N 3/063 |
| 2018/0314671 | A1* | 11/2018 | Zhang | G06N 3/063 |
| 2019/0114537 | A1* | 4/2019 | Wesolowski | G06N 3/105 |
| 2019/0286972 | A1* | 9/2019 | El Husseini | G06N 3/063 |
| 2020/0082258 | A1* | 3/2020 | Gold | G06V 10/774 |
| 2020/0111003 | A1* | 4/2020 | Ross | G06N 5/04 |
| 2020/0167887 | A1* | 5/2020 | Wang | G06T 1/60 |
| 2020/0394499 | A1* | 12/2020 | Yao | G06N 3/0454 |
| 2020/0410337 | A1* | 12/2020 | Huang | G06N 3/04 |
| 2021/0019591 | A1* | 1/2021 | Venkatesh | G06N 3/08 |
| 2021/0081763 | A1* | 3/2021 | Abdelfattah | G06N 20/00 |
| 2021/0182077 | A1* | 6/2021 | Chen | G06V 10/82 |
| 2022/0179575 | A1* | 6/2022 | Balle | G06F 9/4843 |

FOREIGN PATENT DOCUMENTS

WO    WO-2014067268 A1 *  5/2014  ............ H04L 41/12

* cited by examiner

*Primary Examiner* — Anner N Holder
(74) *Attorney, Agent, or Firm* — Kilpatrick Townsend & Stockton LLP

(57) ABSTRACT

Techniques for time-based memory allocation for a neural network inference are disclosed. A description of a neural network comprising a plurality of operations to be executed across a set of accelerators is received. A plurality of interconnect times at a plurality of partition points within the neural network are calculated. Each of the plurality of interconnect times corresponds to a duration of time for transferring an output feature map from one of the set of accelerators to another of the set of accelerators to be used as an input feature map. A partitioning scheme that divides the plurality of operations into a set of subgraphs is determined based on the plurality of interconnect times. Each of the set of subgraphs is assigned to a different accelerator of the set of accelerators in accordance with the partitioning scheme.

16 Claims, 8 Drawing Sheets

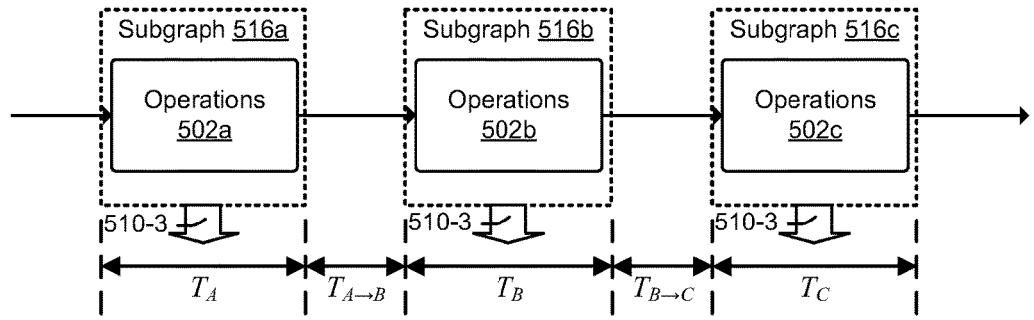
FIG. 5D
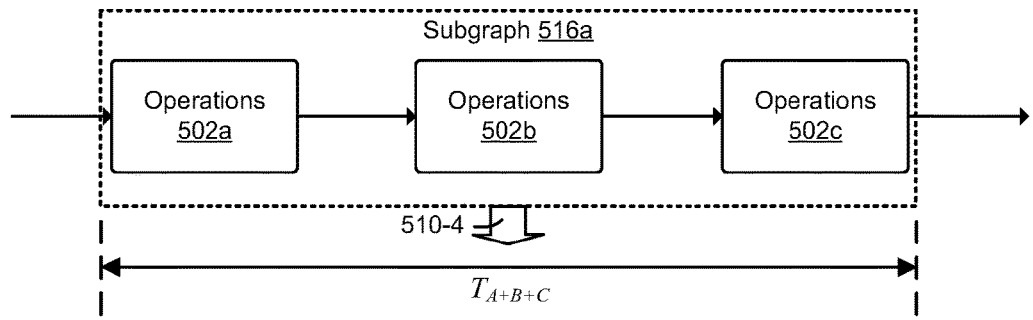
FIG. 5E
| | Latency [μs] | | | | | Maximum # of weights exceeded? |
|---|---|---|---|---|---|---|
| | $T_A$ | $T_{A\to B}$ | $T_B$ | $T_{B\to C}$ | $T_C$ | $T_{TOTAL}$ | |
| Subgraph Assignments 510-1 | 70 | - | 20 | 60 | 30 | 180 | No |
| Subgraph Assignments 510-2 | 70 | 20 | 20 | - | 30 | 140 | No |
| Subgraph Assignments 510-3 | 70 | 20 | 20 | 60 | 30 | 200 | No |
| Subgraph Assignment 510-4 | 70 | - | 20 | - | 30 | 120 | Yes |
FIG. 5F

TIME-BASED MEMORY ALLOCATION FOR NEURAL NETWORK INFERENCE

BACKGROUND

The increasing popularity of using neural networks as a model to create and apply machine learning in various different applications, such as computer vision, speech recognition, and machine translation, among others, has provoked a reexamination of the ways in which underlying hardware technologies are used to train and execute neural networks. Because neural networks can involve large numbers of mathematical operations performed in parallel, adaptations of existing hardware technologies for executing neural networks have been explored, such as techniques for improving the performance of parallel mathematical operations in central processing units (CPUs) and graphics processing units (GPUs) for executing neural networks, along with the introduction of machine learning optimized processing units, such as neural network accelerators, for increasing the capacity to perform the operations included in neural networks. To keep pace with the growing demand for neural network applications including larger and more complex data sets, additional techniques that can further increase the performance of hardware technologies to execute neural networks are highly desirable.

BRIEF DESCRIPTION OF THE DRAWINGS

Various embodiments in accordance with the present disclosure will be described with reference to the drawings.

FIGS. 5A-5F illustrates various partitioning schemes of a neural network for static memory allocation.

DETAILED DESCRIPTION

Figure 1:
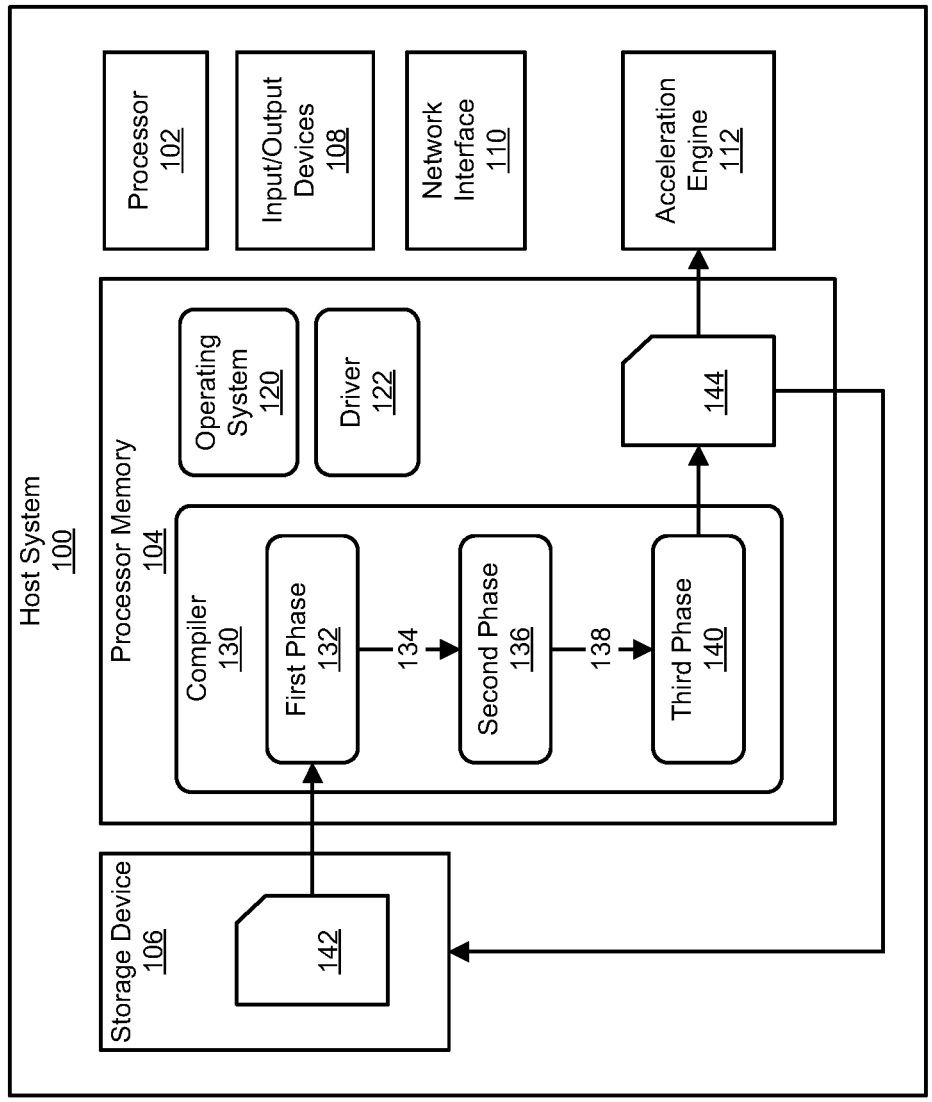
FIG. 1 illustrates a block diagram showing an example of a host system.

Neural network models that are used to implement a machine learning inference may include a graph that describes the computational dataflow between various operations and weight values ("weights") that are applied as part of the operations. The weights may be determined from training of the neural network with training data sets for the particular application in which the neural network is being applied (e.g., image data sets for recognize objects in images). Thus, in various embodiments, the weights may be pre-trained constants that are used as inputs to operators included in the data flow graph of the neural network. For example, resnet50 convolutional neural network may use about 50 CONV2D operators that in total have about 20 million weights. In such an example, each weight may be a float number, typically 16 or 32 bit. Thus, a neural network model trained with 16 bit weights may use 40 MB of weights.

Given the amount of storage used to hold large numbers of weights in the neural network, a dedicated memory for a single processing unit, such as a central processing unit (CPU), graphics processing unit (GPU), or a hardware accelerator like accelerator 202 discussed below in FIG. 2, may be unable to store all of the weights used to execute a neural network. One solution would be to load a portion of the weights in the dedicated memory, wait for the single processing unit to finish executing the operations associated with the loaded weights, and remove and reload the dedicated memory with the next portion of the weights. This process would be repeated until the processing unit has executed all the weights in the neural network. Such a solution would be computationally expensive and slow, and may require extensive dynamic memory allocation.

To overcome these limitations, various techniques of static memory allocation for implementing a neural network inference across multiple processing units are described herein. Static memory allocation for a neural network inference may be implemented to take advantage of the increased dedicated memory capacity of a multiple processing unit solution for executing a neural network. For example, to avoid dynamic memory allocation of weights in a dedicated memory (which may involve selectively loading and reloading weight values from a memory multiple times), the neural network may, in various embodiments, be partitioned into different subgraphs, which may then be assigned to different processing units so that the weights for the assigned subgraph(s) of an individual processing unit may fit within the dedicated memory (as well as saving storage space for other information used to execute the subgraph).

Static memory allocation may thus improve the performance of systems executing neural networks by avoiding the compile-time complexity of finding valid block sizes and scheduling optimal reload orders, allowing a neural network compiler to generate the instructions to execute a neural network faster. Moreover, the performance of the processing units may also be improved as the weight values may be obtained from a dedicated and/or internal memory or cache faster than if the weights had to be read from a non-dedicated memory, as a dedicated cache may have substantially faster access times (e.g., little to no apparent latency of a dedicated cache versus detectable or apparent latency introduced when accessing a non-dedicated memory).

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100 on which a compiler 130, such as is described herein, can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of Random Access Memory, though non-volatile memory types can, alternatively or additionally, be used for the processor memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose built to perform certain operations that can be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed by the acceleration engine 112. When the acceleration engine 112 implements a different type of accelerator, another compiler can be used.

The compiler 130 can be activated, for example, when the operating system 120 receives keyboard, mouse, touchscreen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 includes a first stage 132, a second stage 136, and a third stage 140, which each perform different operations to produce compiled code 144. In other examples, the compiler 130 can combine the operations of the first stage 132, second stage 136, and/or third stage 140 into fewer stages, or can divide the operations of one of the stages into multiple stages.

The first stage 132 can receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

The output 134 of the first stage 132 can be organized, for example, in the layers, nodes, and connections between nodes of a neural network. The second stage 136 can perform intermediate processing on this output 134. For example, the operations performed in any one layer, or at any one node in a layer, may be too many for the acceleration engine 112 to perform at the same time. The acceleration engine 112 may, for example, have a limited amount of locale storage space for the data needed for a computation, or the computations may be more than the acceleration engine 112 can perform at one time. In this example, the first stage 132 can break the operations of the layer or node down into smaller operations, which can fit into the acceleration engine's local memory and/or can fit into the computing capacity of the acceleration engine 112. Processing of the output 134 of the first stage 132 can include other steps, such as scheduling, or determining the order in which the acceleration engine 112 and/or processor 102 will perform operations, among other examples.

In various examples, the output 138 of the second stage 136 includes the various steps to be performed by components of the acceleration engine 112, in the order that the steps are to be performed. The output 138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 140 can operate on the output 138 of the second stage 136, and perform various steps before producing the instructions that are to be executed by the acceleration engine 112. These steps can include, for example, removing redundant dependencies, resolving or handling dependencies between nodes by inserting synchronization instructions into the code, identifying possibly optimizations in memory usage or memory bandwidth usage, and other operations.

The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
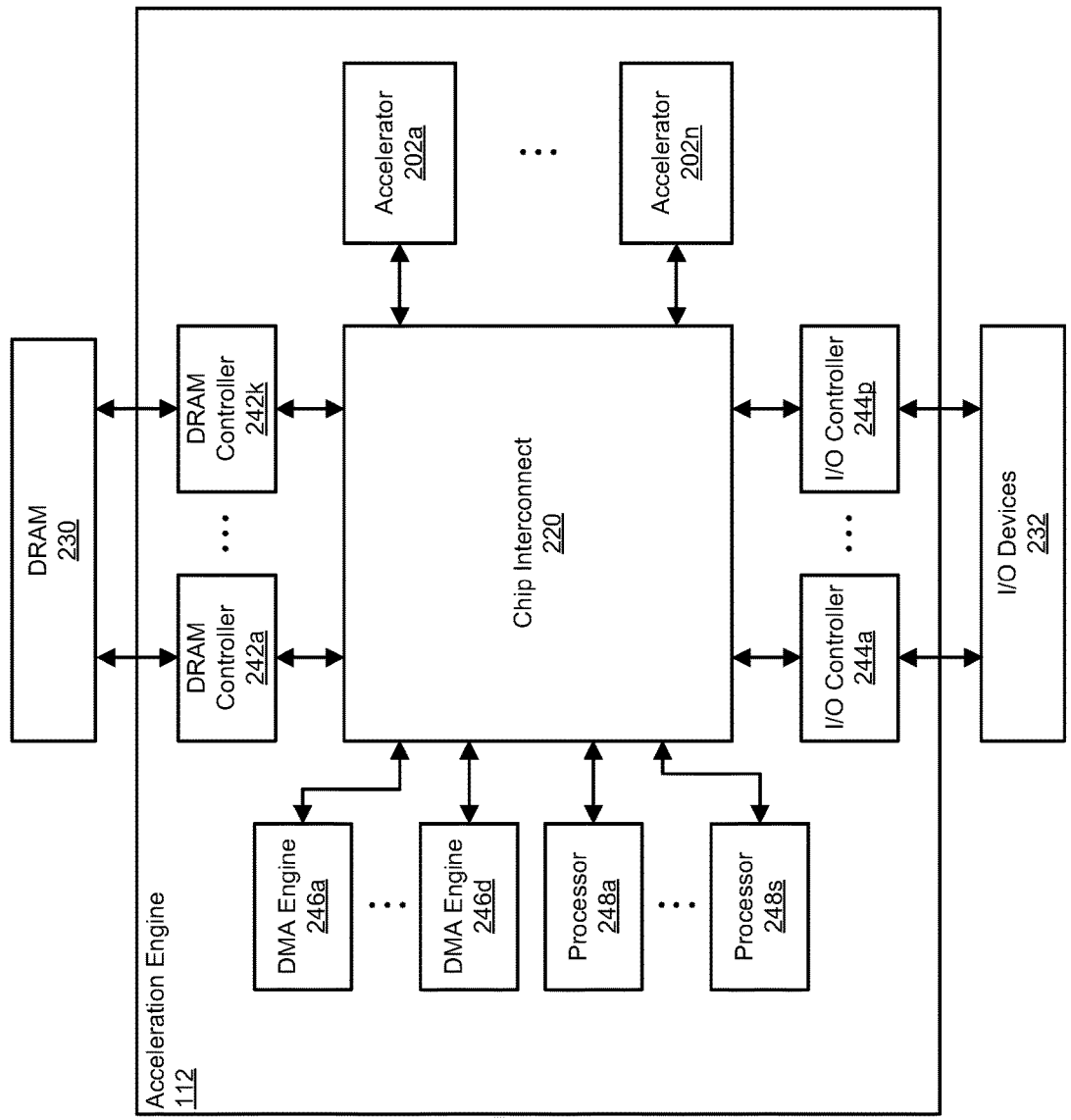
FIG. 2 illustrates a block diagram showing an example of an acceleration engine.

FIG. 2 illustrates a block diagram showing an example of an acceleration engine 112. The acceleration engine 112 is an example of an integrated circuit that can include one or more accelerators 202a-202n.

In the example of FIG. 2, the acceleration engine 112 includes multiple accelerators 202a-202n, each of which can perform a set of operations. In various examples, the accelerators 202a-202n are for particular types of operations, so that the accelerators 202a-202n can perform the operations much faster than when similar operations are performed by a general purpose processor. In various examples, to perform a set of operations, input data on which the operations are to be performed must first be moved into the accelerators 202a-202n. Additionally, in some cases, program code is also moved into the accelerators 202a-202n, which programs the operations that the accelerators 202a-202n will perform on the data. In the illustrated example, the acceleration engine 112 includes n accelerators 202a-202n. Examples of accelerators that can be included in the acceleration engine 112 include graphics accelerators, floating point accelerators, neural network accelerators, and others. In various examples, the accelerators 202a-202n can each be the same (e.g., each of the is a graphics accelerator) or can be different (e.g., the accelerators 202a-202n include a graphics accelerator, a floating point accelerator, and neural network accelerator).

The example acceleration engine 112 further includes DRAM controllers 242a-242k for communicating with an external memory. The external memory is implemented, in this example, using DRAM 230. In the illustrated example, the acceleration engine 112 includes k DRAM controllers 242a-242k, each of which may be able to communicate with an independent set of banks of DRAM. In other examples, other types of RAM technology can be used for the external memory. The DRAM controllers 242a-242k can also be referred to as memory controllers.

In various examples, input data and/or program code for the accelerators 202a-202n can be stored in the DRAM 230. Different programs can cause the accelerators 202a-202n to perform different operations. For example, when one of the accelerators is a neural network accelerator, one program can configure the neural network accelerator to perform speech recognition while another program can configure the neural network accelerator to perform image recognition. In various examples, different accelerators 202a-202n can be programmed with different programs, so that each performs a different set of operations. In various examples, the processors 248a-248s can manage moving of program code from the DRAM 230 to the accelerators 202a-202n.

The example acceleration engine 112 further includes I/O controllers 244a-244p for communicating with I/O devices 232 in the system. The acceleration engine 112 can communicate with I/O devices over, for example, a processor bus. In some examples, the processor bus can be implemented using Peripheral Component Interconnect (PCI) and/or a variation of the PCI bus protocol. The processor bus can connect the acceleration engine 112 to I/O devices such as, for example, input and output devices, memory controllers, storage devices, and/or network interface cards, among other things. In some examples, the I/O controllers 244-244p can enable the acceleration engine 112 to act as an I/O device for a host processor. For example, the acceleration engine 112 can be the recipient of input data from the host processor, and a command indicating an operation to be performed on the input data (e.g., a particular computation or analysis). In the illustrated example, the acceleration engine 112 includes p I/O controllers 244a-244p, each of which may include a separate root complex and may communicate with a separate set of I/O devices 232. In other examples, other standardized bus protocols, such as Ultra Path Interconnect (UPI) can be used for the host bus. In other examples, a proprietary bus protocol can be used.

Movement of data in the acceleration engine 112 can be managed by one or more processors 248a-248s, which can also be referred to as data management processors. In the example of FIG. 2, the acceleration engine 112 includes s processors 248a-248s incorporated into the device (e.g., on the same silicon die). In other examples, the processors 248a-248s can be external to the acceleration engine 112 (e.g., on a different die and/or in a different package). In some examples, the processors 248a-248s can manage the movement of data from I/O devices 232 to the accelerators 202a-202n or the DRAM 230. For example, input data may be located at an I/O device 232 or in processor memory, and the processors 248a-248s can move the input from the I/O device 232 or processor memory into an accelerator or into DRAM 230. As another example, program code for the accelerators 202a-202n may be located on an I/O device 232 or in processor memory.

The example acceleration engine 112 further includes DMA engines 246a-246d that can move data between the accelerators 202a-202n, DRAM controllers 242a-242k, and I/O controllers 244a-244p. In the illustrated example, the acceleration engine 112 includes d DMA engines 246a-246d. In some implementations, the DMA engines 246a-246d can be assigned to specific tasks, such as moving data from the DRAM controllers 242a-242d to the accelerators 202a-202n, or moving data between the I/O controllers 244a-244p and the accelerators 202a-202n. These tasks can be assigned, for example, by enqueueing descriptors with the DMA engines 246a-246d, where a descriptor identifies an address for a block of data and an operation (e.g., a read or a write) to perform. A descriptor, for example, can direct a DMA engine to instruct a DMA controller to read a block of data from DRAM 230. A descriptor can, as a further example, instruct the DMA engine to write data, read by the DMA controller, to an accelerator. Further descriptors can be used to move data from an accelerator to DRAM 230.

In various examples, each of the processors 248a-248s can be responsible for managing the data movement for a different accelerator. In some examples, a processor may manage the data movement for more than one accelerator. Similarly, in various examples, each of the processors 248a-248s can be assigned to one or more DMA engines 246a-246d. In these and other examples, associations between processors 248a-248s, accelerators 202a-202n, and DMA engines 246a-246d are determined by program code being executed by each respective processor.

In the example acceleration engine 112, the various components can communicate over a chip interconnect 220. The chip interconnect 220 primarily includes wiring for routing data between the components of the acceleration engine 112. In some cases, the chip interconnect 220 can include a minimal amount of logic, such as multiplexors to control the direction of data, flip-flops for handling clock domain crossings, and timing logic.

Figure 3:
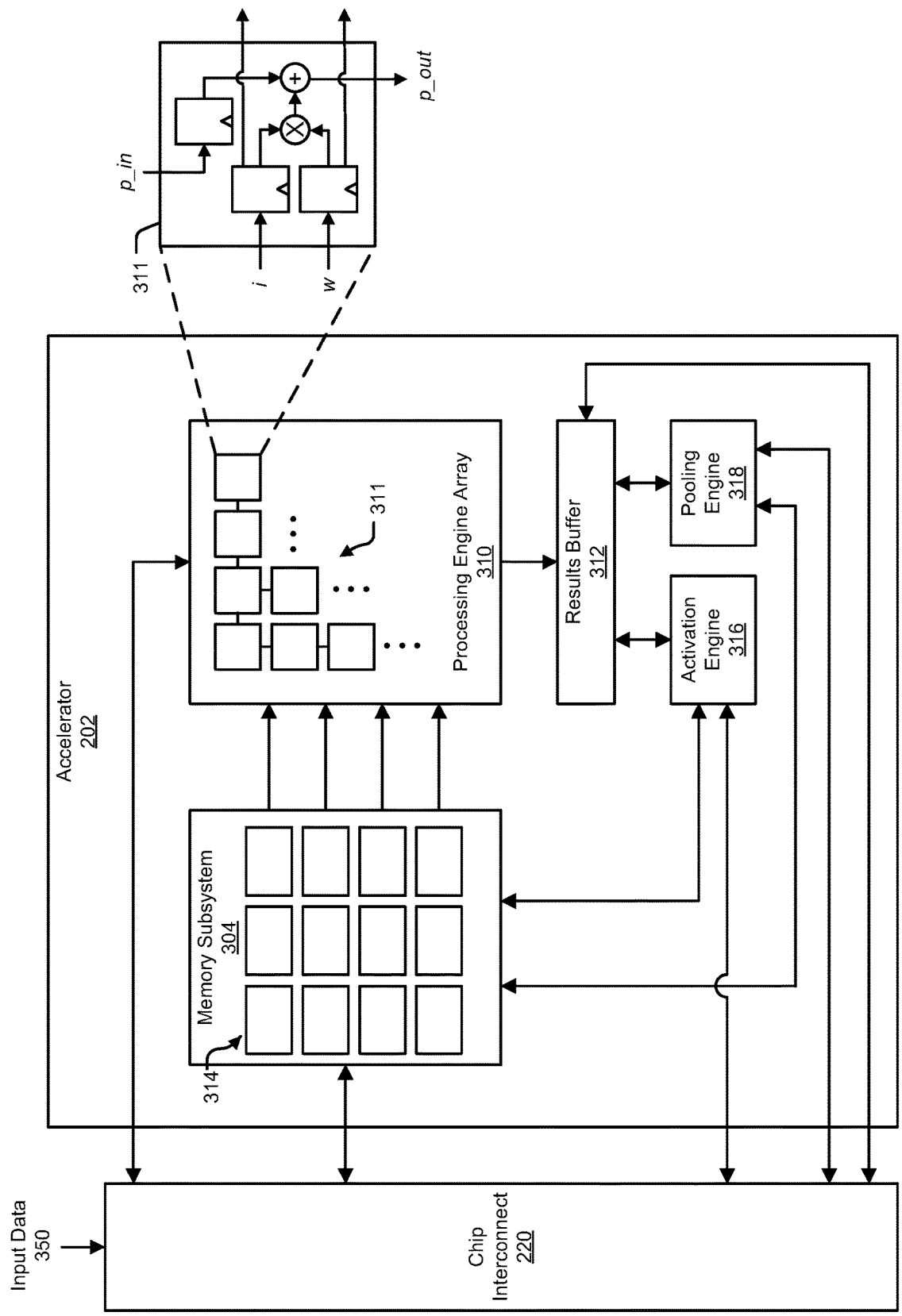
FIG. 3 illustrates a block diagram showing an example of an accelerator.

FIG. 3 is a block diagram illustrating an example of an accelerator 202. In some embodiments, the accelerator 202 may be an integrated circuit device. In various examples, the accelerator 202, for a set of input data (e.g., input data 350), can execute computations using a processing engine array 310, an activation engine 316, and/or a pooling engine 318. In some examples, the example accelerator 202 may be an integrated circuit component of a processor, such as a neural network processor. The processor may have other integrated circuit components, including additional accelerator engines.

In various implementations, the memory subsystem 304 can include multiple memory banks 314. In these implementations, each memory bank 314 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 304 can permit simultaneous access to the read or write channels of multiple memory banks. As another example, the memory subsystem 304 can include arbitration logic such that arbitration between, for example, the outputs of multiple memory banks 314 can result in more than one memory bank's output being used. In these and other examples, though globally managed by the memory subsystem 304, each memory bank can be operated independently of any other.

Having the memory banks 314 be independently accessible can increase the efficiency of the accelerator 202. For example, values can be simultaneously read and provided to each row of the processing engine array 310, so that the entire processing engine array 310 can be in use in one clock cycle. As another example, the memory banks 314 can be read at the same time that results computed by the processing engine array 310 are written to the memory subsystem 304. In contrast, a single memory may be able to service only one read or write at a time. With a single memory, multiple clock cycles can be required, for example, to read input data for each row of the processing engine array 310 before the processing engine array 310 can be started.

In various implementations, the memory subsystem 304 can be configured to simultaneously service multiple clients, including the processing engine array 310, the activation engine 316, the pooling engine 318, and any external clients that access the memory subsystem 304 over a communication fabric 220. In some implementations, being able to service multiple clients can mean that the memory subsystem 304 has at least as many memory banks as there are clients. In some cases, each row of the processing engine array 310 can count as a separate client. In some cases, each column of the processing engine array 310 can output a result, such that each column can count as a separate write client. In some cases, output from the processing engine array 310 can be written into the memory banks 314 that can then subsequently provide input data for the processing engine array 310. As another example, the activation engine 316 and the pooling engine 318 can include multiple execution channels, each of which can be separate memory clients. The memory banks 314 can be implemented, for example, using static random access memory (SRAM).

In various implementations, the memory subsystem 304 can include control logic. The control logic can, for example, keep track of the address spaces of each of the memory banks 314, identify memory banks 314 to read from or write to, and/or move data between the memory banks 314. In some implementations, memory banks 314 can be hardwired to particular clients. For example, a set of memory banks 314 can be hardwired to provide values to the rows of the processing engine array 310, with one memory bank servicing each row. As another example, a set of memory banks can be hard wired to receive values from columns of the processing engine array 310, with one memory bank receiving data for each column.

The processing engine array 310 is the computation matrix of the example accelerator 202. The processing engine array 310 can, for example, execute parallel integration, convolution, correlation, and/or matrix multiplication, among other things. The processing engine array 310 includes multiple processing engines 311, arranged in rows and columns, such that results output by one processing engine 311 can be input directly into another processing engine 311. Processing engines 311 that are not on the outside edges of the processing engine array 310 thus can receive data to operate on from other processing engines 311, rather than from the memory subsystem 304.

In various examples, the processing engine array 310 uses systolic execution, in which data arrives at each processing engine 311 from different directions at regular intervals. In some examples, input data can flow into the processing engine array 310 from the left and weight values can be loaded at the top. In some examples weights and input data can flow from the left and partial sums can flow from top to bottom. In these and other examples, a multiply-and-accumulate operation moves through the processing engine array 310 as a diagonal wave front, with data moving to the right and down across the array. Control signals can be input at the left at the same time as weights, and can flow across and down along with the computation.

In various implementations, the number of columns in the processing engine array 310 determines the computational capacity of the processing engine array 310, and the number of rows determines the required memory bandwidth for achieving maximum utilization of the processing engine array 310. The processing engine array 310 can have, for example, 64 columns and 428 rows, or some other number of columns and rows.

An example of a processing engine 311 is illustrated in FIG. 3 in an inset diagram. As illustrated by this example, a processing engine 311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 311.

In the illustrated example, an input from above can include a partial sum, p_in, provided either from another processing engine 311 or from a previous round of computation by the processing engine array 310. When starting a computation for a new set of input data, the top row of the processing engine array 310 can receive a fixed value for p_in, such as zero. As illustrated by this example, i and w are multiplied together and the result is summed with p in to produce a new partial sum, p_out, which can be input into another processing engine 311. Various other implementations of the processing engine 311 are possible.

Outputs from the last row in the processing engine array 310 can be temporarily stored in the results buffer 312. The results can be intermediate results, which can be written to the memory banks 314 to be provided to the processing engine array 310 for additional computation. Alternatively, the results can be final results, which, once written to the memory banks 314 can be read from the memory subsystem 304 over the communication fabric 220, to be output by the system.

In some implementations, the accelerator 202 includes an activation engine 316. In these implementations, the activation engine 316 can combine the results from the processing engine array 310 into one or more output activations. For example, for a convolutional neural network, convolutions from multiple channels can be summed to produce an output activation for a single channel. In other examples, accumulating results from one or more columns in the processing engine array 310 may be needed to produce an output activation for a single node in the neural network. In some examples, activation engine 316 can be bypassed.

In various examples, the activation engine 316 can include multiple separate execution channels. In these examples, the execution channels can correspond to the columns of the processing engine array 310, and can perform an operation on the outputs of a column, the result of which can be stored in the memory subsystem 304. In these examples, the activation engine 316 may be able to perform between 1 and n parallel computations, where n is equal to the number of columns in the processing engine array 310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 318. Pooling is the combining of outputs of the columns of the processing engine array 310. Combining can include for example, computing a maximum value, a minimum value, an average value, a median value, a summation, a multiplication, or another logical or mathematical combination. In various examples, the pooling engine 318 can include multiple execution channels that can operating on values from corresponding columns of the processing engine array 310. In these examples, the pooling engine 318 may be able to perform between 1 and n parallel computations, where n is equal to the number of columns in the processing engine array 310. In various examples, execution channels of the pooling engine 318 can operate in parallel and/or simultaneously. In some examples, the pooling engine 318 can be bypassed.

Herein, the activation engine 316 and the pooling engine 318 may be referred to collectively as execution engines. The processing engine array 310 is another example of an execution engine. Another example of an execution engine is a Direct Memory Access (DMA) engine, which may be located outside the accelerator 202.

Input data 350 can arrive over the communication fabric 220. The communication fabric 220 can connect the accelerator 202 to other components of a processor, such as a DMA engine that can obtain input data 350 from an Input/Output (I/O) device, a storage drive, or a network interface. The input data 350 can be, for example one-dimensional data, such as a character string or numerical sequence, or two-dimensional data, such as an array of pixel values for an image or frequency and amplitude values over time for an audio signal. In some examples, the input data 350 can be three-dimensional, as may be the case with, for example, the situational information used by a self-driving car or virtual reality data. In some implementations, the memory subsystem 304 can include a separate buffer for the input data 350.

In some implementations, the input data 350 can be stored in the memory banks 314 when the accelerator 202 receives the input data 350.

In some examples, the accelerator 202 can implement a neural network processing engine. In these examples, the accelerator 202, for a set of input data 350, can execute a neural network to perform a task for which the neural network was trained. Executing a neural network on a set of input data can be referred to as inference or performing inference.

The weights for the neural network can be stored in the memory subsystem 304, along with input data 350 on which the neural network will operate. The neural network can also include instructions, which can program the processing engine array 310 to perform various computations on the weights and the input data. The instructions can also be stored in the memory subsystem 304, in the memory banks 314 or in a separate instruction buffer. The processing engine array 310 can output intermediate results, which represent the outputs of individual layers of the neural network. In some cases, the activation engine 316 and/or pooling engine 318 may be enabled for computations called for by certain layers of the neural network. The accelerator 202 can store the intermediate results in the memory subsystem 304 for inputting into the processing engine array 310 to compute results for the next layer of the neural network. The processing engine array 310 can further output final results from a last layer of the neural network. The final results can be stored in the memory subsystem 304 and then be copied out to host processor memory or to another location.

Figure 4:
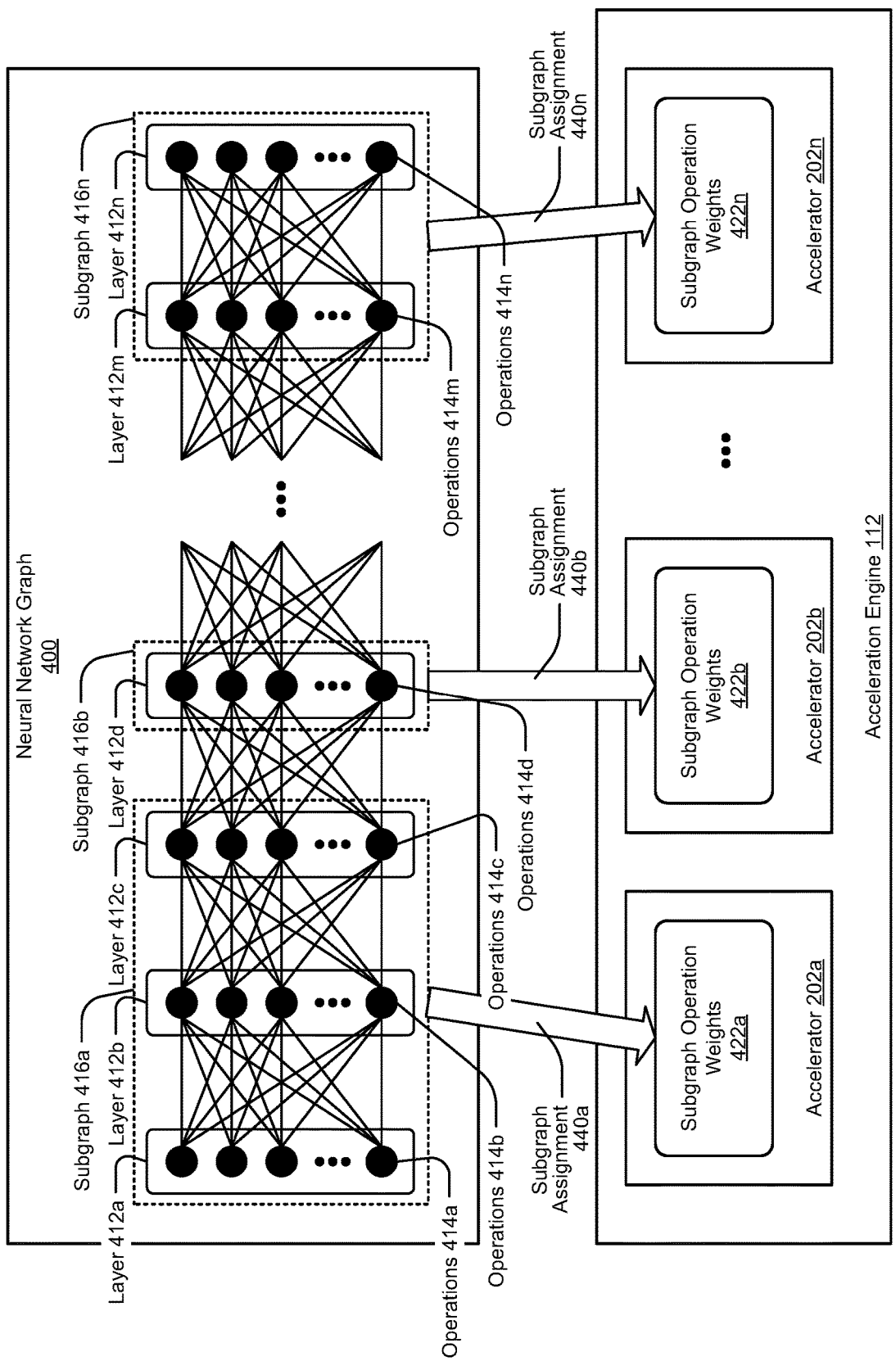
FIG. 4 illustrates a block diagram showing an example of static memory allocation for performing a neural network inference.

FIG. 4 illustrates a block diagram showing an example of static memory allocation for performing a neural network inference, according to some embodiments. FIG. 4 illustrates a neural network graph 400 that may be generated based on a description of a neural network. For example, a neural network may be provided (e.g., via an interface to a host system for executing neural networks as discussed above with regard to FIG. 1) for execution across multiple accelerators, such as accelerators 202a-202n. The neural network may include multiple different layers as part of modeling, for instance, inference outputs of the neural network, such as layers 412a-412n. These layers 412 may include one or multiple operations, such as the illustrated nodes that represent operations 414a-414n in the respective layers 412. For example, operations may include convolution, pooling, normalization, and/or activation operations, in some embodiments.

As discussed herein, different partitioning schemes may be applied to identify different subgraphs of the neural network graph 400, such as subgraphs 416a-416n. For example, different features of the operations in a subgraph may be considered, such as the number of weights used in the operations, the number of operations in a subgraph, the expected/predicted execution time for operations in a subgraph, the expected/predicted interconnect time for transferring and/or storing feature maps between successive subgraphs, and the like. In some partitioning schemes, partitions into the subgraphs 416 may be restricted to contiguous subgraphs, whereas in other partitioning schemes non-contiguous sub-graphs may be used.

Instructions to assign the subgraphs, such as subgraph assignments 440a-440n, to the accelerators 202 may be made. When performed, these instructions may cause the weights for the operations in a subgraph to be statically allocated to a portion of a dedicated memory for one of the accelerators 202. For example, statically allocated subgraph operation weights 422a may be loaded from a separate memory into a dedicated memory for accelerator 202a. The subgraph operation weights 422a may be for a single subgraph, or, in other cases, may be for multiple subgraphs assigned to the same accelerator 202a. Similar static allocations for different subgraphs, as illustrated by subgraph assignments 440b-440n, for dedicated memories used by accelerators 202a-202n may be made. In this way, the subgraph operation weights 422 that are statically allocated in the dedicated memories may not be overwritten or removed from the dedicated memories while executing the neural network associated with the neural network graph 400.

Figure 5A:
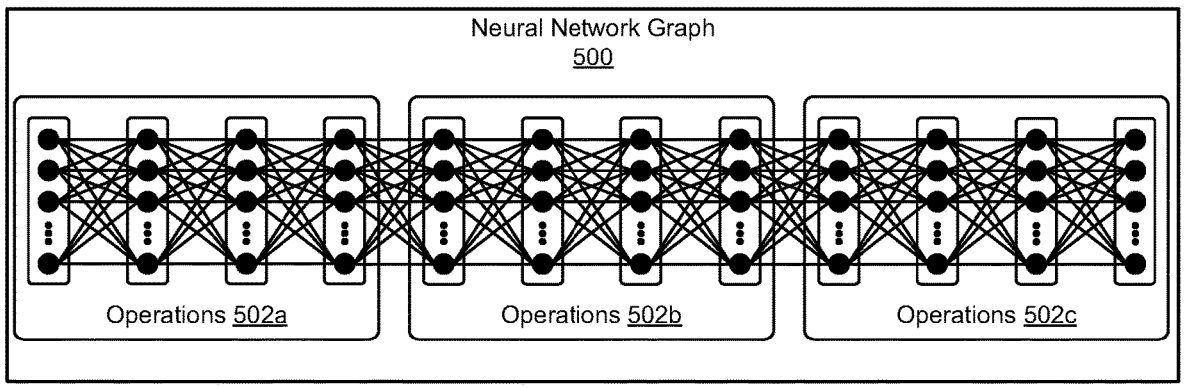

FIGS. 5A-5F illustrates various partitioning schemes of a neural network for static memory allocation. FIG. 5A illustrates a neural network graph 500 associated with a neural network that includes multiple operations arranged in multiple layers. The operations may be grouped into multiple sets of operations 502. For example, the operations may be grouped into a first set of operations 502a, a second set of operations 502b, and a third set of operations 502c. Each of the sets of operations 502 may include operations of a single layer or of multiple layers of the neural network. In the illustrated embodiment, each of the sets of operations 502 include 4 layers of the neural network.

Figure 5B:
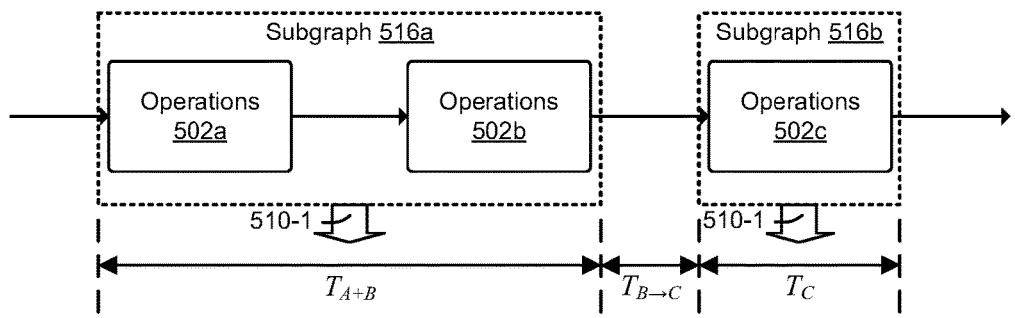

FIG. 5B illustrates a first partitioning scheme that includes subgraph assignments 510-1. The first partitioning scheme divides the operations into a first subgraph 516a (that includes the sets of operations 502a and 502b) and a second subgraph 516b (that includes the set of operations 502c). Under the first partitioning scheme, the first subgraph 516a is assigned to a first accelerator of an execution engine and the second subgraph 516b is assigned to a second accelerator of the execution engine. The second accelerator may be different from the first accelerator.

In some examples, an execution time $T_{A+B}$ for executing the operations contained in the first subgraph 516a on one of the accelerators may be calculated. The execution time $T_{A+B}$ may correspond to the amount of time it takes to generate an output feature map at the partition point between the first subgraph 516a and the second subgraph 516b by executing the operations contained in the first subgraph 516a. The execution time $T_{A+B}$ may be calculated based on the number of operations in the first subgraph 516a, the number of different types of operations (e.g., matrix multiplications) in the first subgraph 516a, the size of the output feature map, among other possibilities.

In some examples, an interconnect time $T_{B \rightarrow C}$ for transferring the generated output feature map between accelerators may be calculated. The interconnect time $T_{B \rightarrow C}$ may correspond to the amount of time it takes to transfer the output feature map from the accelerator to which the first subgraph 516a is assigned to the accelerator to which the second subgraph 516b is assigned. The interconnect time $T_{B \rightarrow C}$ may further include the amount of time it takes to store the output feature map at a memory used by the accelerator to which the second subgraph 516b is assigned.

In some examples, an execution time $T_C$ for executing the operations contained in the second subgraph 516b on one of the accelerators may be calculated. The execution time Tc may correspond to the amount of time it takes to generate an output feature map by executing the operations contained in the second subgraph 516b. The execution time $T_C$ may be calculated based on the number of operations in the second subgraph 516b, the number of different types of operations (e.g., matrix multiplications) in the second subgraph 516b, the size of the output feature map, among other possibilities.

Figure 5C:
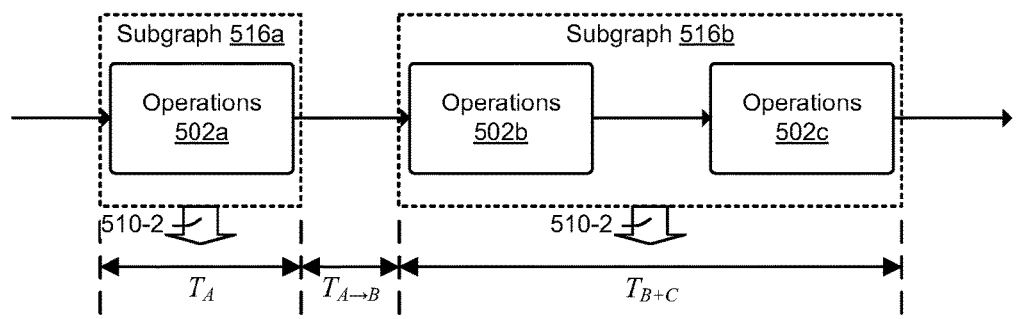

FIG. 5C illustrates a second partitioning scheme that includes subgraph assignments 510-2. The second partitioning scheme divides the operations into a first subgraph 516a (that includes the set of operations 502a) and a second subgraph 516b (that includes the sets of operations 502b and 502c). Under the second partitioning scheme, the first subgraph 516a is assigned to a first accelerator of an execution engine and the second subgraph 516b is assigned to a second accelerator of the execution engine. The second accelerator may be different from the first accelerator.

In some examples, an execution time $T_A$ for executing the operations contained in the first subgraph 516a on one of the accelerators may be calculated. The execution time $T_A$ may correspond to the amount of time it takes to generate an output feature map at the partition point between the first subgraph 516a and the second subgraph 516b by executing the operations contained in the first subgraph 516a. In some examples, an interconnect time $T_{A \rightarrow B}$ for transferring the generated output feature map between accelerators may be calculated. The interconnect time $T_{A \rightarrow B}$ may correspond to the amount of time it takes to transfer the output feature map from the accelerator to which the first subgraph 516a is assigned to the accelerator to which the second subgraph 516b is assigned. The interconnect time $T_{A \rightarrow B}$ may further include the amount of time it takes to store the output feature map at a memory used by the accelerator to which the second subgraph 516b is assigned. In some examples, an execution time $T_{B+C}$ for executing the operations contained in the second subgraph 516b on one of the accelerators may be calculated. The execution time $T_{B+C}$ may correspond to the amount of time it takes to generate an output feature map by executing the operations contained in the second subgraph 516b.

FIG. 5D illustrates a third partitioning scheme that includes subgraph assignments 510-3. The third partitioning scheme divides the operations into a first subgraph 516a (that includes the set of operations 502a), a second subgraph 516b (that includes the set of operations 502b), and a third subgraph 516c (that includes the set of operations 502c). Under the third partitioning scheme, the first subgraph 516a is assigned to a first accelerator of an execution engine, the second subgraph 516b is assigned to a second accelerator of the execution engine, and the third subgraph 516c is assigned to a third accelerator of the execution engine. The second accelerator may be different from the first accelerator, and the third accelerator may be different from the first and second accelerators.

In some examples, an execution time $T_A$ for executing the operations contained in the first subgraph 516a on one of the accelerators may be calculated. The execution time $T_A$ may correspond to the amount of time it takes to generate an output feature map at the partition point between the first subgraph 516a and the second subgraph 516b by executing the operations contained in the first subgraph 516a. In some examples, an interconnect time $T_{A \rightarrow B}$ for transferring the generated output feature map between accelerators may be calculated. The interconnect time $T_{A \rightarrow B}$ may correspond to the amount of time it takes to transfer the output feature map from the accelerator to which the first subgraph 516a is assigned to the accelerator to which the second subgraph 516b is assigned. The interconnect time $T_{A \rightarrow B}$ may further include the amount of time it takes to store the output feature map at a memory used by the accelerator to which the second subgraph 516b is assigned.

In some examples, an execution time $T_B$ for executing the operations contained in the second subgraph 516b on one of the accelerators may be calculated. The execution time TB may correspond to the amount of time it takes to generate an output feature map at the partition point between the second subgraph 516b and the third subgraph 516c by executing the operations contained in the second subgraph 516b. In some examples, an interconnect time $T_{B \rightarrow C}$ for transferring the generated output feature map between accelerators may be calculated. The interconnect time $T_{B \rightarrow C}$ may correspond to the amount of time it takes to transfer the output feature map from the accelerator to which the second subgraph 516b is assigned to the accelerator to which the third subgraph 516c is assigned. The interconnect time $T_{B \rightarrow C}$ may further include the amount of time it takes to store the output feature map at a memory used by the accelerator to which the third subgraph 516c is assigned.

In some examples, an execution time Tc for executing the operations contained in the third subgraph 516c on one of the accelerators may be calculated. The execution time Tc may correspond to the amount of time it takes to generate an output feature map by executing the operations contained in the third subgraph 516c.

FIG. 5E illustrates a fourth partitioning scheme that includes subgraph assignment 510-4. Under the third partitioning scheme, a first subgraph 516a containing all of the operations is assigned to a first accelerator of an execution engine. In some examples, an execution time $T_{A+B+C}$ for executing the operations contained in the first subgraph 516a on one of the accelerators may be calculated. The execution time $T_{A+B+C}$ may correspond to the amount of time it takes to generate an output feature map by executing the operations contained in the first subgraph 516a.

FIG. 5F illustrates a table 550 containing latency values (in microseconds) corresponding to the execution times and interconnect times described in FIGS. 5B-5E. By summing relevant execution times and interconnect times for each of the partitioning schemes, a total time $T_{TOTAL}$ can be estimated and compared with other estimations. In some examples, it may also be determined whether each of the subgraph assignments 510 causes the subgraph operation weights to exceed a maximum operation weight limit associated with the dedicated memory used by any of the accelerators. As illustrated in table 550, while the subgraph assignment 510-4 results in the lowest total time, such a partitioning scheme cannot be employed due to the subgraph operation weights exceeding the maximum operation weight limit. Accordingly, the compiler may select the second partitioning scheme (subgraph assignment 510-2) that exhibits the next lowest total time and also satisfies the maximum operation weight limit.

Figure 6A:
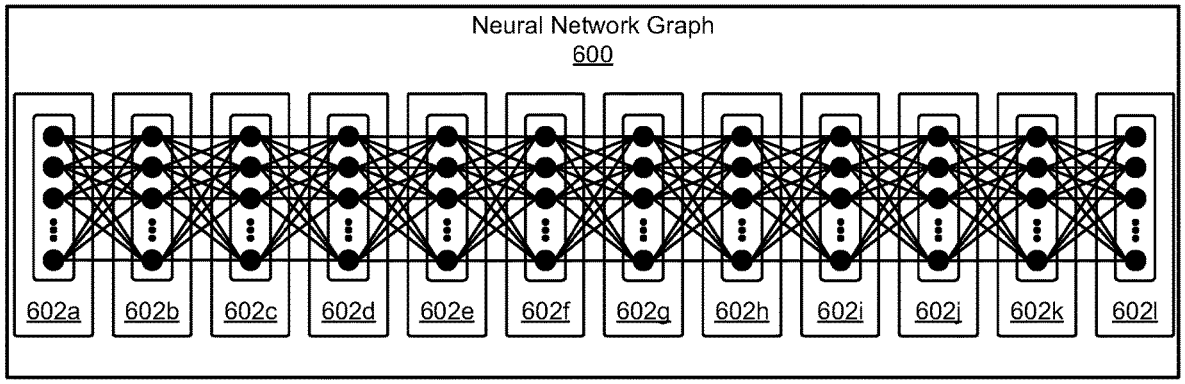
FIGS. 6A and 6B illustrate an example of determining a partitioning scheme for partitioning operations of a neural network for static memory allocation.
Figure 6B:
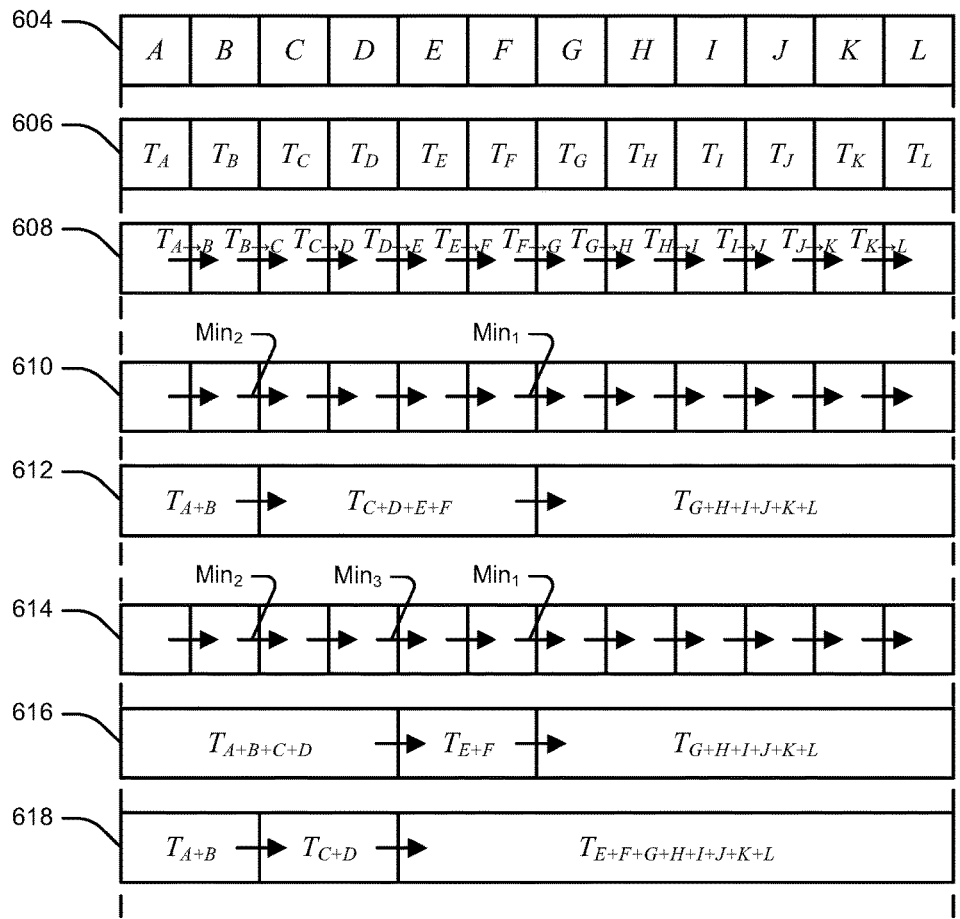

FIGS. 6A and 6B illustrate an example of determining a partitioning scheme for partitioning operations of a neural network for static memory allocation. FIG. 6A illustrates a neural network graph 600 associated with a neural network that includes multiple operations arranged in multiple layers. The operations may be grouped into multiple sets of operations 602. In the illustrated embodiment, each of the sets of operations 602 include a single layer of the neural network.

FIG. 6B illustrates example steps for determining a partitioning scheme for execution of the neural network operations on 3 accelerators. At step 604, the sets of operations 602a, 602b, . . . 602l (denoted by A, B, . . . L) are identified within the neural network graph 600. Partition points between the sets of operations 602a, 602b, . . . 602l may also be identified. At step 606, execution times $T_A$, $T_B$, . . . $T_L$ associated with the sets of operations 602a, 602b, . . . 602l are calculated as described herein. At step 608, interconnect times $T_{A \rightarrow B}$, $T_{B \rightarrow C}$, . . . $T_{K \rightarrow L}$ are calculated as described herein.

At step 610, the interconnect times $T_{A \to B}$, $T_{B \to C}$, ... $T_{K \to L}$ are compared to identify the 2 lowest interconnect times (one less than the number of accelerators). As illustrated, the interconnect time $T_{F \to G}$ is identified as the lowest interconnect time (denoted by $Min_1$) and the interconnect time $T_{B \to C}$ is identified as the next-lowest interconnect time (denoted by $Min_2$). At step 612, it is determined whether a partitioning scheme that divides the sets of operations 602a, 602b, . . . 602l into subgraphs using the partition points associated with interconnect times $T_{F \to G}$ and $T_{B \to C}$ satisfies the maximum operation weight limit. Upon determining that one of the subgraphs includes subgraph operation weights that exceed the maximum operation weight limit (e.g., the second subgraph), the partitioning scheme is not used and the method moves to step 614.

At step 614, the interconnect times $T_{A \to B}$, $T_{B \to C}$, ... $T_{K \to L}$ are compared to identify the interconnect time $T_{D \to E}$ as the next-lowest interconnect time (denoted by $Min_3$). At step 616, it is determined whether a partitioning scheme that divides the sets of operations 602a-602l into subgraphs using the partition points associated with the interconnect times $T_{D \to E}$ and $T_{F \to G}$ ($Min_3$ and $Min_1$, which are the current lowest combination of interconnect times) satisfies the maximum operation weight limit. Upon determining that one of the subgraphs includes subgraph operation weights that exceed the maximum operation weight limit (e.g., the first subgraph), it is determined whether there are additional combinations of interconnect times that have not been considered.

At step 618, it is determined whether a partitioning scheme that divides the sets of operations 602a-602l into subgraphs using the partition points associated with the interconnect times $T_{B \to C}$ and $T_{D \to E}$ ($Min_2$ and $Min_3$, which are the current lowest combination of interconnect times) satisfies the maximum operation weight limit. Upon determining that each of the subgraphs includes subgraph operation weights that do not exceed the maximum operation weight limit, the partitioning scheme is used for subgraph assignment. In this manner, the partitioning scheme with the lowest combination of interconnect times may be determined.

In some embodiments, when multiple combinations of interconnect times are being considered, such as the partitioning schemes depicted at steps 616 and 618, the compiler may additionally or alternatively calculate/estimate the total time $T_{TOTAL}$ for each of the partitioning schemes and identify the minimum total time $T_{TOTAL}$.

Figure 7:
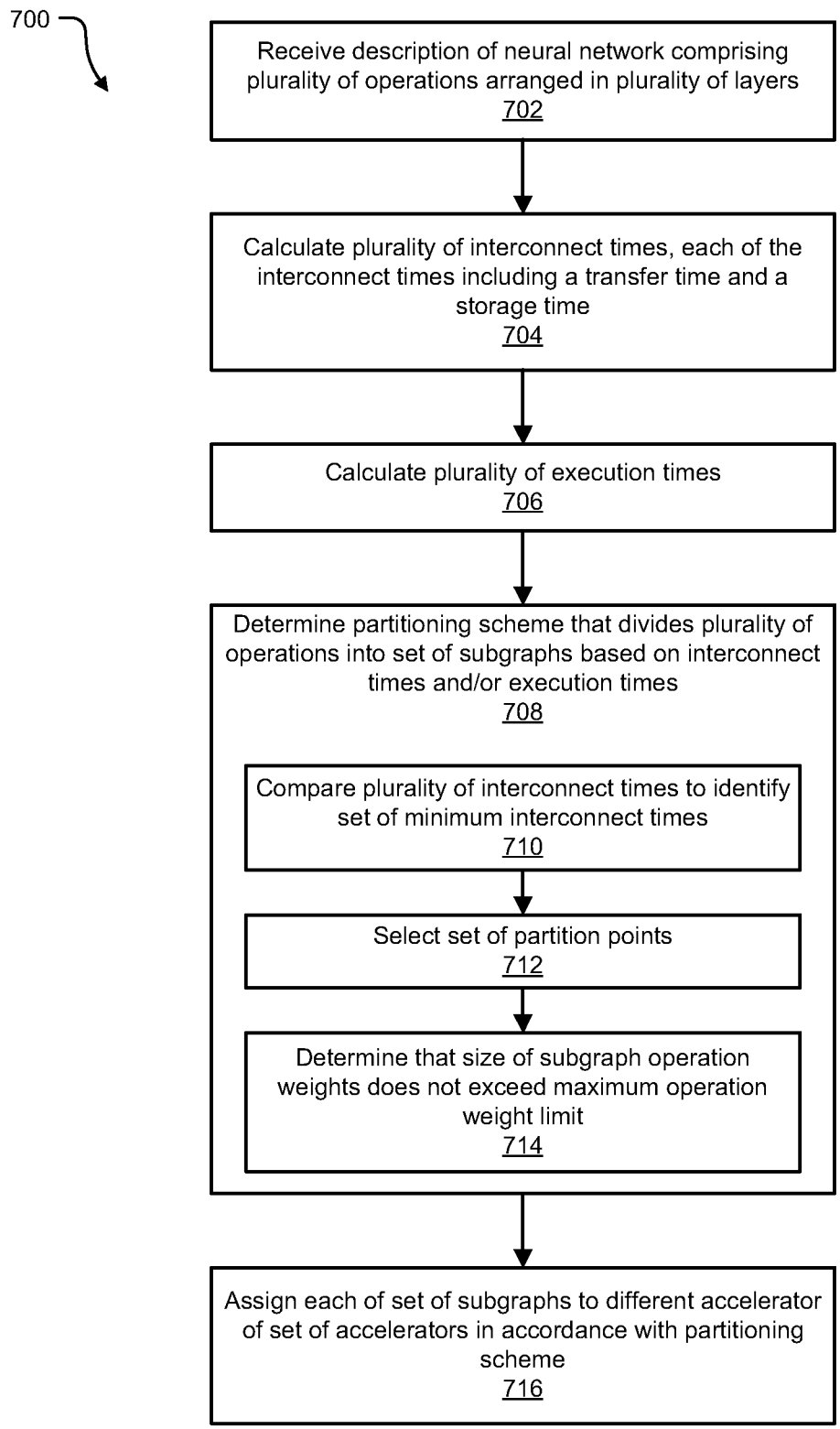
FIG. 7 illustrates a method for partitioning a neural network for static memory allocation.

FIG. 7 illustrates a method 700 for partitioning a neural network for static memory allocation, according to some embodiments of the present disclosure. One or more steps of the method 700 may be performed in a different order than is shown in the illustrated embodiment, and one or more steps may be omitted during performance of the method 700. The method 700 may be implemented by the systems described above. For example, the method 700 may be performed by a compiler (e.g., the compiler 130) operating on a host system (e.g., the host system 100).

At step 702, a description of a neural network (e.g., the neural network graphs 400, 500, 600) is received. The neural network may include a plurality of operations (e.g., the operations 414) arranged in a plurality of layers (e.g., the layers 412). In some embodiments, the description of the neural network may be received by the compiler operating on the host system. In some embodiments, the description of the neural network may be received in the form of input code (e.g., the input code 142). In some embodiments, the plurality of operations are to be executed across a set of accelerators (e.g., the accelerators 202). In some embodiments, the set of accelerators may be part of an acceleration engine (e.g., the acceleration engine 112).

At step 704, a plurality of interconnect times (e.g., the interconnect times $T_{A \to B}$, $T_{B \to C}$, ... $T_{K \to L}$) are calculated at a plurality of partition points within the neural network. In some embodiments, each of the plurality of interconnect times corresponds to a duration of time for transferring an output feature map from one of the set of accelerators to another of the set of accelerators to be used as an input feature map. In some embodiments, each of the plurality of interconnect times includes a transfer time that corresponds to the amount of time it takes to transfer the output feature map from one of the set of accelerators to another of the set of accelerators. For example, in some embodiments the output feature map may not be transferred directly between the dedicated memories of the two accelerators, but may be first transferred from the dedicated memory of the first accelerator (e.g., the memory subsystem 304) to DRAM (e.g., the DRAM 230) and subsequently from DRAM to the dedicated memory of the second accelerator (e.g., the memory subsystem 304). In some embodiments, each of the plurality of interconnect times includes a storage time that corresponds to the amount of time it takes to store the output feature map at the dedicated memory of the second accelerator (e.g., the memory subsystem 304) and/or the amount of time used for reversing space at the dedicated memory of the second accelerator (e.g., the memory subsystem 304). In some embodiments, the plurality of interconnect times are estimated using empirical data gathered from previous inferences.

At step 706, a plurality of execution times (e.g., the execution times $T_A$, $T_B$, ... $T_L$) are calculated. In some embodiments, each of the execution times corresponds to the amount of time it takes to generate an output feature map at a partition point on one of the set of accelerators from the time the accelerator receives an input feature map (the input feature map being an output feature map of a previous accelerator). In some embodiments, the plurality of execution times are estimated using empirical data gathered from previous inferences.

At step 708, a partitioning scheme that divides the plurality of operations into a set of subgraphs (e.g., the subgraphs 416, 516) is determined based on the plurality of interconnect times and/or the plurality of execution times. In some embodiments, the compiler performs automatic detection or determination of a quantity of accelerators to be utilized, which may inform the quantity of subgraphs. In some partitioning schemes, partitions into subgraphs may be restricted to contiguous subgraphs, whereas in other partitioning schemes non-contiguous subgraphs may be used. In some embodiments, step 708 includes one or more of steps 710, 712, and 714.

At step 710, the plurality of interconnect times are compared to identify a set of minimum interconnect times. In some embodiments, the quantity of the set of minimum interconnect times is one less than the quantity of the set of accelerators. For example, if the operations are to be executed across 3 accelerators, then the 2 lowest interconnect times may be identified.

At step 712, a set of partition points for dividing the plurality of operations in accordance with the partitioning scheme are selected based on the comparison performed in step 710. In some embodiments, the set of partition points are selected based on the set of minimum interconnect times. In some embodiments, a set of subgraphs are defined based on the set of partition points.

At step 714, it is determined whether a size of subgraph operation weights (e.g., the subgraph operation weights 422) associated with the plurality of operations included in each of the set of subgraphs (as defined by the set of partition points) does not exceed a maximum operation weight limit. In some embodiments, if the set of subgraphs satisfy the maximum operation weight limit (e.g., none of the set of subgraphs exceed the limit), then the partitioning scheme is considered to be acceptable. Otherwise, the method 700 may return to step 710 and/or step 712 to identify an additional minimum interconnect time and/or to select a new set of partition points to define a new set of subgraphs. For example, if the 2 lowest interconnect times have already been identified, then the $3^{rd}$ lowest interconnect time from the plurality of interconnect may be identified. In some embodiments, the compiler may determine the maximum operation weight limit associated with the memory used by each of the set of accelerators prior to performance of step 714.

At step 716, each of the set of subgraphs are assigned to a different accelerator of the set of accelerators in accordance with the partitioning scheme. In some embodiments, the compiler may generate instructions for each of the set of accelerators to execute the plurality of operations contained in their respective subgraphs.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A non-transitory computer-readable medium having stored therein instructions that, when executed by one or more processors, cause the one or more processors to execute a compiler, the compiler performing operations including:
   receiving a description of a neural network comprising a plurality of operations arranged in a plurality of layers, wherein the plurality of operations are to be executed across N accelerators of an acceleration engine;
   calculating, at a first partition point within the neural network, a first interconnect time for transferring a first output feature map from one of the N accelerators to another of the N accelerators to be used as a first input feature map;
   calculating, at a second partition point within the neural network, a second interconnect time for transferring a second output feature map from one of the N accelerators to another of the N accelerators to be used as a second input feature map;
   determining a partitioning scheme that divides the plurality of operations into N subgraphs based on the first interconnect time and the second interconnect time, wherein determining the partitioning scheme includes:

selecting either the first partition point or the second partition point for dividing the plurality of operations in accordance with the partitioning scheme based on identifying a minimum interconnect time between the first interconnect time and the second interconnect time; and determining, for the partitioning scheme, that a size of subgraph operation weights associated with the plurality of operations included in each of the N subgraphs does not exceed a maximum operation weight limit; and assigning each of the N subgraphs to a different accelerator of the N accelerators in accordance with the partitioning scheme.

2. The non-transitory computer-readable medium of claim 1, wherein:

the first interconnect time includes a first storage time for storing the first output feature map at a first memory used by one of the N accelerators; and the second interconnect time includes a second storage time for storing the second output feature map at a second memory used by one of the N accelerators.

3. The non-transitory computer-readable medium of claim 1, wherein:

the first interconnect time includes a first transfer time for transferring the first output feature map from one of the N accelerators to another of the N accelerators; and the second interconnect time includes a second transfer time for transferring the second output feature map from one of the N accelerators to another of the N accelerators.

4. The non-transitory computer-readable medium of claim 1, wherein the operations further comprise:

calculating a first execution time for generating the first output feature map on one of the N accelerators; and calculating a second execution time for generating the second output feature map on one of the N accelerators, wherein the partitioning scheme is determined further based on the first execution time and the second execution time.

5. A method comprising:

receiving a description of a neural network comprising a plurality of operations arranged in a plurality of layers, wherein the plurality of operations are to be executed across a set of accelerators;

calculating a plurality of interconnect times at a plurality of partition points within the neural network, wherein each of the plurality of interconnect times corresponds to a duration of time for transferring an output feature map from one of the set of accelerators to another of the set of accelerators to be used as an input feature map;

determining a partitioning scheme that divides the plurality of operations into a set of subgraphs based on the plurality of interconnect times, wherein determining the partitioning scheme includes selecting a set of partition points for dividing the plurality of operations in accordance with the partitioning scheme based on identifying a set of minimum interconnect times from amongst the plurality of interconnect times; and assigning each of the set of subgraphs to a different accelerator of the set of accelerators in accordance with the partitioning scheme.

6. The method of claim 5, wherein each of the plurality of interconnect times includes a storage time for storing the output feature map at a memory used by one of the set of accelerators.

7. The method of claim 5, wherein each of the plurality of interconnect times includes a transfer time for transferring the output feature map from one of the set of accelerators to another of the set of accelerators.

8. The method of claim 5, further comprising:

calculating a plurality of execution times for generating a plurality of output feature maps at the plurality of partition points on the set of accelerators, wherein each of the plurality of execution times corresponds to a duration of time for generating the output feature map on one of the set of accelerators, wherein the partitioning scheme is determined further based on the plurality of execution times.

9. The method of claim 5, wherein each of the set of accelerators includes a systolic array coupled to a memory subsystem.

10. The method of claim 5, wherein determining the partitioning scheme includes:

determining, for the partitioning scheme, that a size of subgraph operation weights associated with the plurality of operations included in each of the set of subgraphs does not exceed a maximum operation weight limit.

11. A non-transitory computer-readable medium having stored therein instructions that, when executed by one or more processors, cause the one or more processors to perform operations comprising:

receiving a description of a neural network comprising a plurality of operations arranged in a plurality of layers, wherein the plurality of operations are to be executed across a set of accelerators;

calculating a plurality of interconnect times at a plurality of partition points within the neural network, wherein each of the plurality of interconnect times corresponds to a duration of time for transferring an output feature map from one of the set of accelerators to another of the set of accelerators to be used as an input feature map;

determining a partitioning scheme that divides the plurality of operations into a set of subgraphs based on the plurality of interconnect times, wherein determining the partitioning scheme includes selecting a set of partition points for dividing the plurality of operations in accordance with the partitioning scheme based on identifying a set of minimum interconnect times from amongst the plurality of interconnect times; and assigning each of the set of subgraphs to a different accelerator of the set of accelerators in accordance with the partitioning scheme.

12. The non-transitory computer-readable medium of claim 11, wherein each of the plurality of interconnect times includes a storage time for storing the output feature map at a memory used by one of the set of accelerators.

13. The non-transitory computer-readable medium of claim 11, wherein each of the plurality of interconnect times includes a transfer time for transferring the output feature map from one of the set of accelerators to another of the set of accelerators.

14. The non-transitory computer-readable medium of claim 11, wherein the operations further comprise:

calculating a plurality of execution times for generating a plurality of output feature maps at the plurality of partition points on the set of accelerators, wherein each of the plurality of execution times corresponds to a duration of time for generating the output feature map on one of the set of accelerators, wherein the partitioning scheme is determined further based on the plurality of execution times.

15. The non-transitory computer-readable medium of claim 11, wherein each of the set of accelerators includes a systolic array coupled to a memory subsystem.

16. The non-transitory computer-readable medium of claim 11, wherein determining the partitioning scheme includes:
   determining, for the partitioning scheme, that a size of subgraph operation weights associated with the plurality of operations included in each of the set of subgraphs does not exceed a maximum operation weight limit.

* * * * *